(12) United States Patent
Pappu et al.

(10) Patent No.: US 12,425,678 B2
(45) Date of Patent: Sep. 23, 2025

(54) LOW LATENCY COMMUNICATION PATH FOR AUDIO/VISUAL (A/V) APPLICATIONS

(71) Applicant: Intel Corporation, Santa Clara, CA (US)

(72) Inventors: Lakshminarayana Pappu, Folsom, CA (US); Nausheen Ansari, Folsom, CA (US); Howard Heck, Tigard, OR (US); Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 17/523,502

(22) Filed: Nov. 10, 2021

(65) Prior Publication Data

US 2022/0070522 A1 Mar. 3, 2022

(51) Int. Cl.
*H04N 21/43* (2011.01)
*G06F 13/38* (2006.01)
*G06T 19/00* (2011.01)
*H04N 21/422* (2011.01)

(52) U.S. Cl.
CPC ..... *H04N 21/43072* (2020.08); *G06F 13/382* (2013.01); *H04N 21/422* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 10,635,610 | B1* | 4/2020 | Calder | G06F 13/1668 |
| 2010/0091096 | A1* | 4/2010 | Oikawa | G06T 7/73 |
| | | | | 348/E13.001 |
| 2018/0130260 | A1* | 5/2018 | Schmirler | G06F 3/011 |
| 2019/0317774 | A1* | 10/2019 | Raghav | G06F 9/4411 |
| 2021/0089480 | A1* | 3/2021 | Chan | G06F 9/45558 |

* cited by examiner

Primary Examiner — Clifford Hilaire
(74) Attorney, Agent, or Firm — Hanley, Flight & Zimmerman, LLC (57) ABSTRACT

Embodiments relate to a controller subsystem that includes a virtual reality (VR) subsystem to: identify data received from a peripheral device as related to an audio/visual (A/V) function of the peripheral device; direct, based on the identification that the data is related to the A/V function of the peripheral device, the data to be stored in a memory subsystem of the controller subsystem; and facilitate transmission of an indication of a storage location of the data in the memory subsystem to a host system that is communicatively coupled with the controller subsystem. The controller subsystem further includes a graphics engine to: identify, in a message received from the host system based on the transmission of the indication of the storage location of the data, instructions related to rendering the data; and generate, based on the data received from the peripheral device, rendered data. Other embodiments may be described and claimed.

20 Claims, 9 Drawing Sheets

LOW LATENCY COMMUNICATION PATH FOR AUDIO/VISUAL (A/V) APPLICATIONS

FIELD

Embodiments of the present invention relate generally to the technical field of electronic circuits, and more particularly to low latency communication paths for audio/visual (A/V) applications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Generally, A/V applications such as virtual reality (VR) or augmented reality (AR) benefit from high resolution (on the order of greater than 2,000 pixels per eye) to provide a better immersive experiences. However, the resultant increased amount of data may result in higher data transfer latencies (on the order of, for example, greater than 7 milliseconds (ms)) between data inputs such as movement of the head set sensor or camera and outputs such as rendering. These latencies may result in increased user motion or simulator sickness.

Additionally, some VR or AR applications may require the use of headsets. An increased number of cables between such a headset and a host device such as a gaming console or computer system may reduce user mobility and reduce the immersive aspects of the experience.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about" generally refer to being within +/−10% of a target value. Unless otherwise specified, the use of the ordinal adjectives "first," "second," and "third," etc., to describe a common object merely indicate that different instances of like objects are being referred to, and are not intended to imply that the objects so described must be in a given sequence, either temporally, spatially, in ranking, or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As previously noted, A/V applications such as AR or VR may benefit from high resolution, but such resolution may come at the cost of increased latency in legacy systems. This latency may result in increased user motion or simulator sickness. Additionally, in order to enhance the immersive experience of such applications, it may be desired to reduce or eliminate the number or thickness of physical connections (e.g., wires) between an AR or VR device such as a headset and a host device such as a gaming console, computing device, or other electronic system. Specifically, in a legacy AR or VR application, multiple connectors may be required. For example, one connector may be used for video content, another connector (e.g., USB) may be required for audio and/or sensor information, etc. However, embodiments herein may use universal serial bus (USB) type-C solutions (also referred to as USB type-C). USB type-C may allow for the use of a single connector that can transport both high-speed display and USB content to various peripheral devices. More specifically, one of the type-C lanes may be used for display, while the remaining lanes may be used for USB applications.

Generally, legacy systems have supported lower resolution displays (e.g., 720 pixels per eye, 1080 pixels per eye), etc., which have allowed for lower latency. However, the legacy systems typically do not process displays with resolutions greater than 2000 pixels where latency is a greater issue. Additionally or alternatively, legacy systems may use a virtual link, which may provide increased cost and/or numbers of wires, which may be undesirable as described above.

Embodiments herein relate to the use of a solution that supports high-resolution displays (e.g., on the order of 2000 pixels per eye) with relatively low latency (e.g., on the order of less than approximately 7 milliseconds) between the sensors connected to a head mounted display and a resultant rendered image. Additionally, embodiments may use USB type-C, which may obviate the need for several wires connected to a given peripheral device such as a headset, as described above.

Specifically, embodiments herein may allow for a controller subsystem to identify data received from a peripheral device as A/V data related to VR or AR applications. Based on that identification, the controller subsystem may route the A/V data to a local memory subsystem rather than into host memory. By routing the data to the local memory subsystem, rather than the host memory, the latency of the overall rendering process may be significantly reduced, as will be described below.

Figure 1:
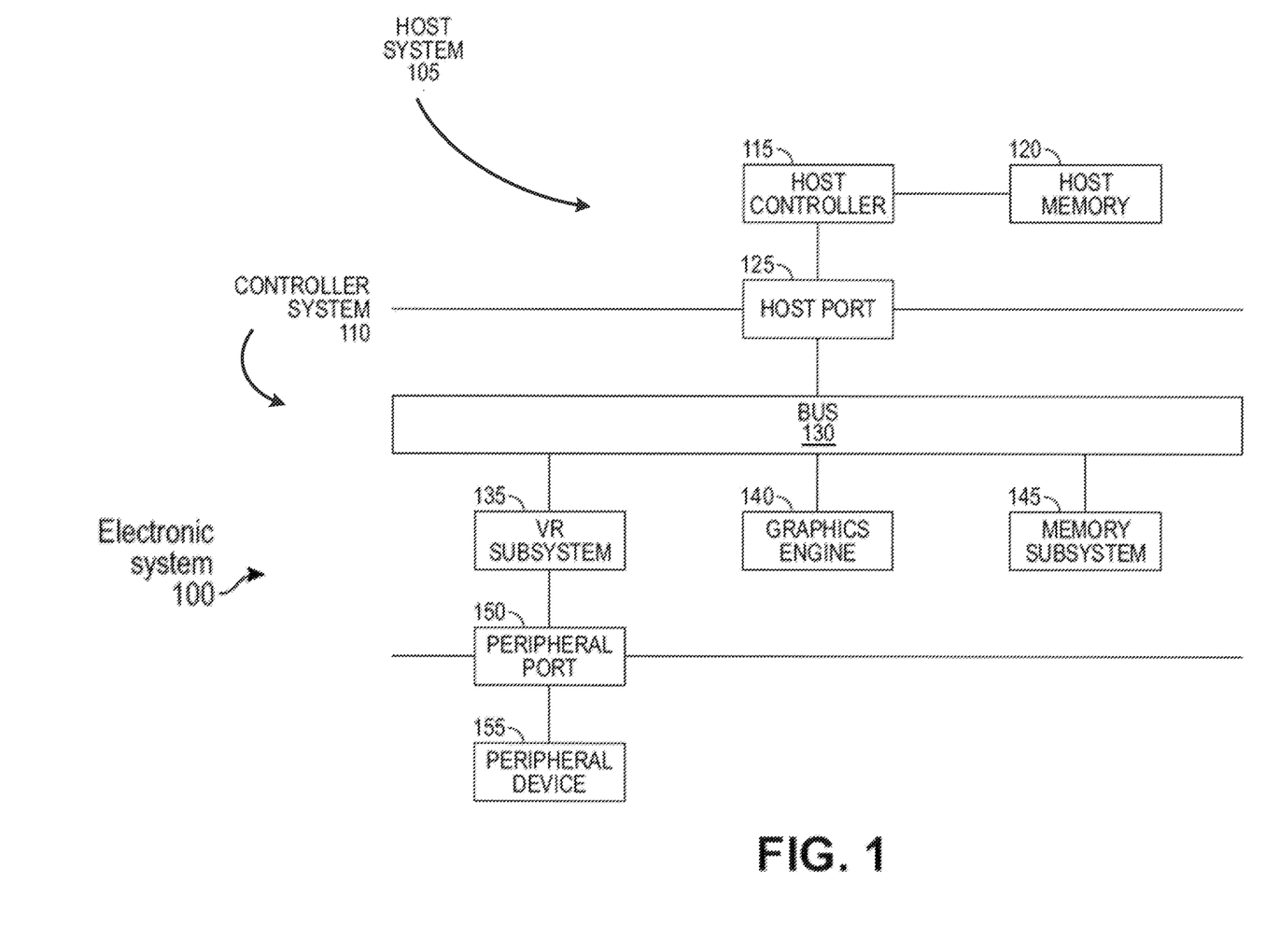
FIG. 1 illustrates a simplified block diagram of an example electronic system, in accordance with various embodiments.

FIG. 1 illustrates a simplified block diagram of an example electronic system 100, in accordance with various embodiments. It will be understood that such electronic system is a highly simplified diagram for the purposes of discussion only.

In embodiments, the electronic system 100 may include a host system 105 and a controller subsystem 110. The host system 105 and the controller subsystem 110 may be communicatively coupled with one another by a host port 125, which may be, for example, a Peripheral Component Interconnect Express (PCIe) interface or some other type of interface that allows for communication between the controller subsystem 110 and the host system 105.

The host system 105 and the controller subsystem 110 may be implemented in an electronic device such as a gaming console, a laptop computer, a desktop computer, a tablet, a smartphone, a personal digital assistant (PDA), or some other type of electronic device. In such an embodiment, the host system 105 may be or may be a part of a host architecture such as a "motherboard" or some other type of architecture. The controller subsystem 110 may be implemented as a System on Chip (SoC) that is communicatively coupled with the host system 105 by the host port 125.

The host controller 115 may be or may include a processor or other logic. Such a processor may be a central processing unit (CPU), a processor core of a multi-core processor, or some other type of processor or logic. The host memory 120 may be or include memory such as random access memory (RAM), double data rate RAM (DDR RAM), flash memory, or some other type of memory that is configured to store data such that it may be written to and/or read from the host memory 120.

The controller subsystem 110 may include a bus 130 that communicatively couples a VR subsystem 135, a graphics engine 140, and a memory subsystem 145. The memory subsystem 145 may be or include memory such as graphics DDR (GDDR) memory, synchronous dynamic RAM (SDRAM), and/or some other type of memory. In general, the memory subsystem 145 may include memory that is suitable (or optimized) for graphics applications such as storage of input data, rendered output data (e.g., one or more graphical images), or some other type of data related to graphics rendering. However, it will be understood that in other embodiments different types of memory may be used.

The graphics engine 140 may be or include one or more processors, processor cores, or some other type of logic that is implemented as hardware, software, and/or firmware. The graphics engine 140 may be configured to receive, as inputs, one or more pieces of data and generate rendered data that may be displayed to a user (e.g., via a peripheral device as will be described below). In some embodiments, the input data received by the graphics engine may be data generated or otherwise provided by one or more sensors of a peripheral device such as a headset. The data may be based on movement of the peripheral device (e.g., as may be provided by an accelerometer), a sound that is identified by the device (e.g., as may be provided by a microphone), visual data related to a location at which the device is located (e.g., as may be provided by a camera), RADAR or LiDAR data, or some other type of data. Based on the input data, the graphics engine may generate (e.g., render) an updated image that is to be displayed to a user. For example, if the data indicates that the user turned their head, then the graphics engine 140 may generate one or more images that correspondingly change a scene that is to be displayed to a user.

The VR subsystem 135 may include logic or circuitry implemented as hardware, software, and/or firmware that is configured to facilitate interactions between a peripheral device and other elements of the controller subsystem 110. For example, the VR subsystem 135 may include logic that is capable of identifying data received from a peripheral device as being A/V data that is related to, or configured for, VR and/or AR applications. The VR subsystem 135 may further include logic that is capable of altering the data (e.g., through appending a tag to the data or some other alteration) to indicate that the data is related to A/V data of the peripheral device. In some embodiments, the VR subsystem 135 and/or the bus 130 may include one or more routing elements (which may also be implemented as hardware, software, and/or firmware) that are configured to route the A/V data in accordance with the tags, as will be described in further detail below.

In some embodiments, the VR subsystem 135 may be configured to communicate with peripheral port 150, which enables communication between the controller subsystem 110 and a peripheral device 155. In other embodiments, the VR subsystem 135 may include the peripheral port 150. In some embodiments, the peripheral port 150 may be or include a universal serial bus (USB) port. Specifically, in some embodiments the USB port may be a USB 2.0 port, a USB 3.0 port, a USB Type-C port, or some other type of port. In these embodiments, the VR subsystem 135 may include logic such as a USB host controller that is configured to convert data formatted in accordance with the USB protocol to data that is formatted in accordance with protocols of the host system 105 and/or the controller subsystem 110, or vice versa.

It will be noted that the description of subsystem 135 as a "VR subsystem" is intended for the sake of discussion and to provide a distinguishing label for the subsystem 135. For example, in some embodiments the VR subsystem 135 may additionally or alternatively be referred to as an "AR subsystem."

The electronic system 100 may further include, or be coupled with, the peripheral device 155. As previously noted, the peripheral device 155 may be a VR and/or AR device such as a headset, a tablet, a PDA, a mobile phone, or some other type of peripheral device that is capable of providing a VR and/or AR experience to a user. In some embodiments, the peripheral device 155 may be coupled to the controller subsystem 110, and particularly the peripheral port 150, by a physical wire (e.g., a USB cable or some other type of physical coupling). In other embodiments, the peripheral device 155 may be communicatively coupled with the peripheral port 150 in a wireless manner. For example, the peripheral port 150 may be communicatively coupled with a dongle that is plugged in to the peripheral port 150. In another embodiment, the peripheral port 150 itself may be capable of a wireless protocol that is capable of communicating with the peripheral device 155. Other variations of such a communicative coupling may be possible in other embodiments.

Figure 2A:
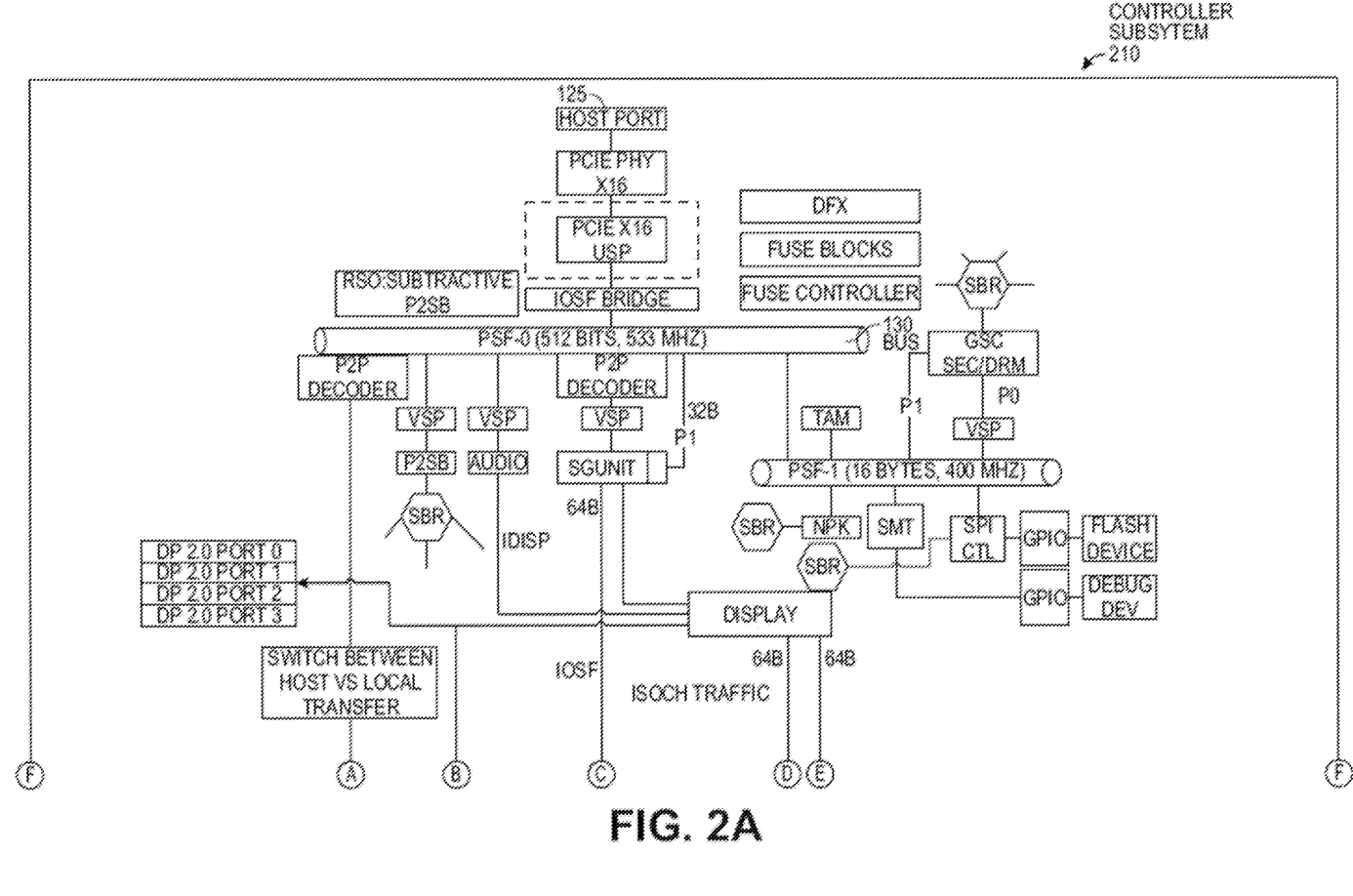
FIGS. 2a and 2b illustrate a diagram of an example controller subsystem, in accordance with various embodiments.
Figure 2B:
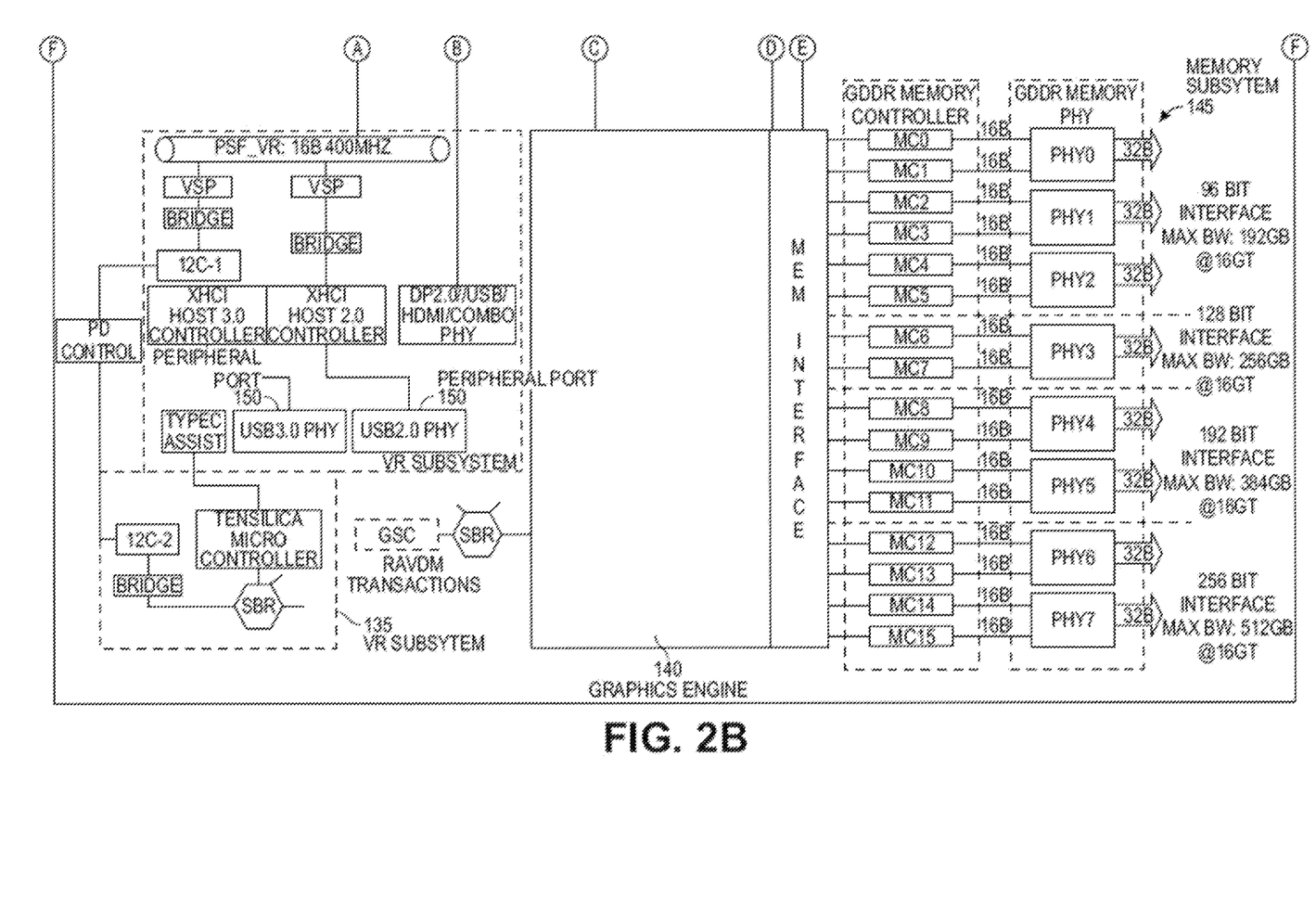

FIGS. 2a and 2b (collectively, "FIG. 2") illustrate a diagram of an example controller subsystem 210, in accordance with various embodiments. Specifically, the controller subsystem 210 may be similar to, and share one or more elements with, the controller subsystem 110 of FIG. 1. The controller subsystem 210 is intended to provide an example of a more detailed architecture of such a subsystem than the highly simplified block diagram of FIG. 1. However, it will be understood that the specific configuration, and connection, of the various elements may be different in different embodiments. Additionally, it may be seen that the VR subsystem 135 may include a plurality of peripheral ports 150, rather than the peripheral port(s) being separate from the VR subsystem as depicted in FIG. 1.

Figure 3A:
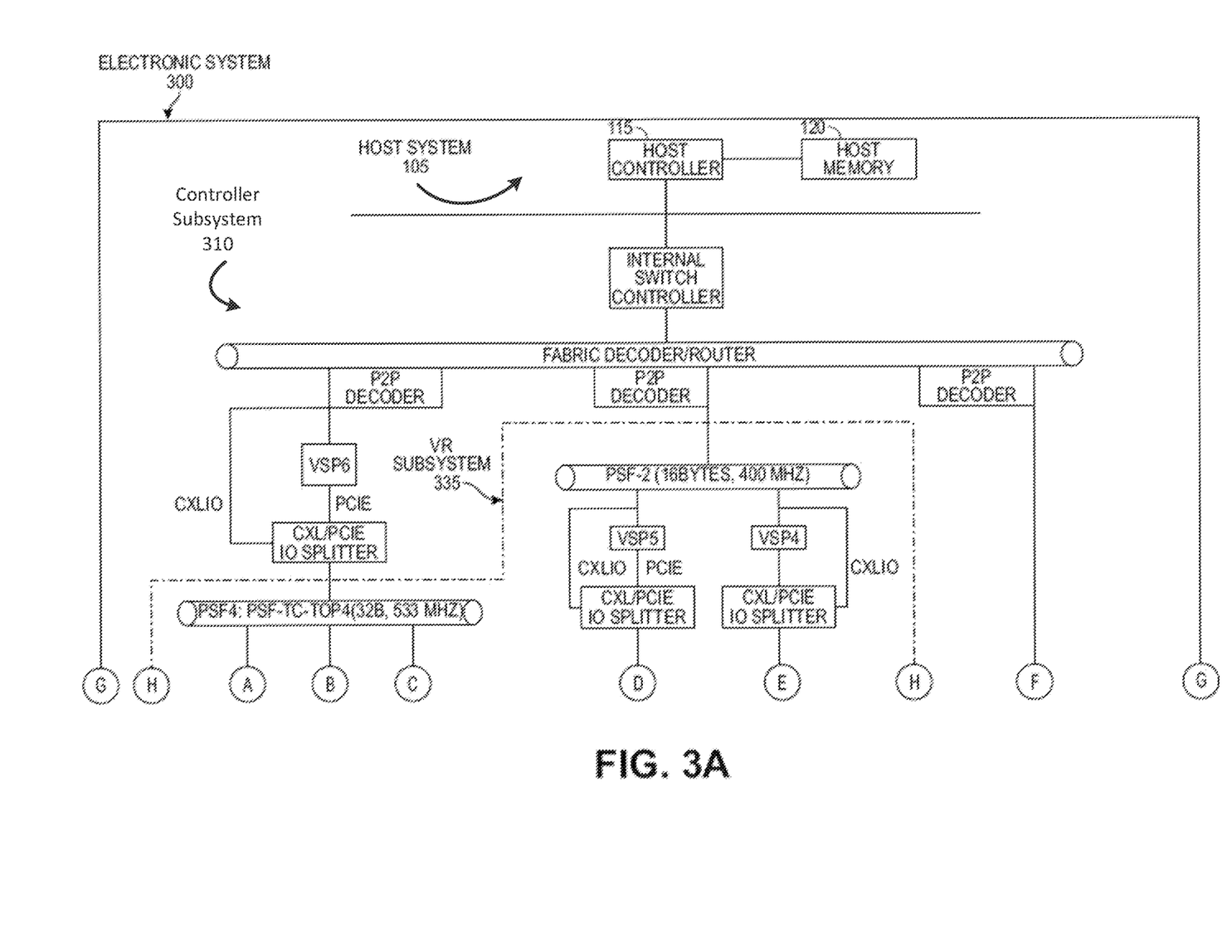
FIGS. 3a and 3b illustrates an alternative example electronic system that includes a host system and a controller subsystem, in accordance with various embodiments.
Figure 3B:
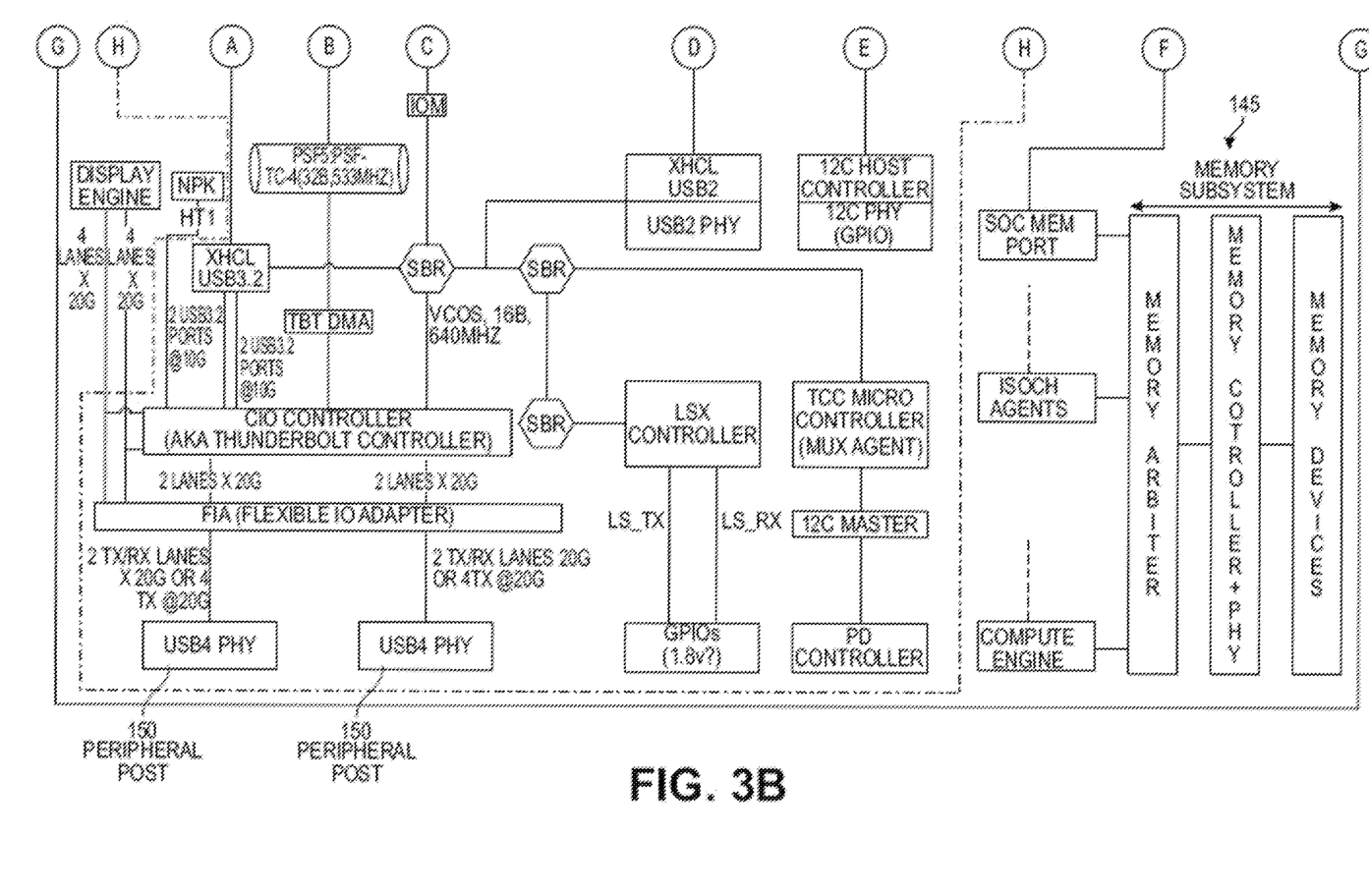

FIGS. 3a and 3b (collectively, "FIG. 3") illustrates an alternative example electronic system 300 that includes a host system 105 and a controller subsystem 310, in accordance with various embodiments. The controller subsystem 310 may include a VR subsystem 335. The controller subsystem 310 may be similar to, and share one or more characteristics with, the controller subsystem 210. Similarly, the VR subsystem 335 may be similar to, and share one or more characteristics with, VR subsystem 135. Generally, the embodiment of the electronic system 300, and particularly the controller subsystem 310 or VR subsystem 335, may be seen as similar to the electronic system of FIG. 1. The embodiment depicted in FIG. 3 is intended to depict such a system, and particularly the controller subsystem 310 and/or VR subsystem 335, at a different level of detail than may be depicted in FIG. 2 or 3.

Figure 4:
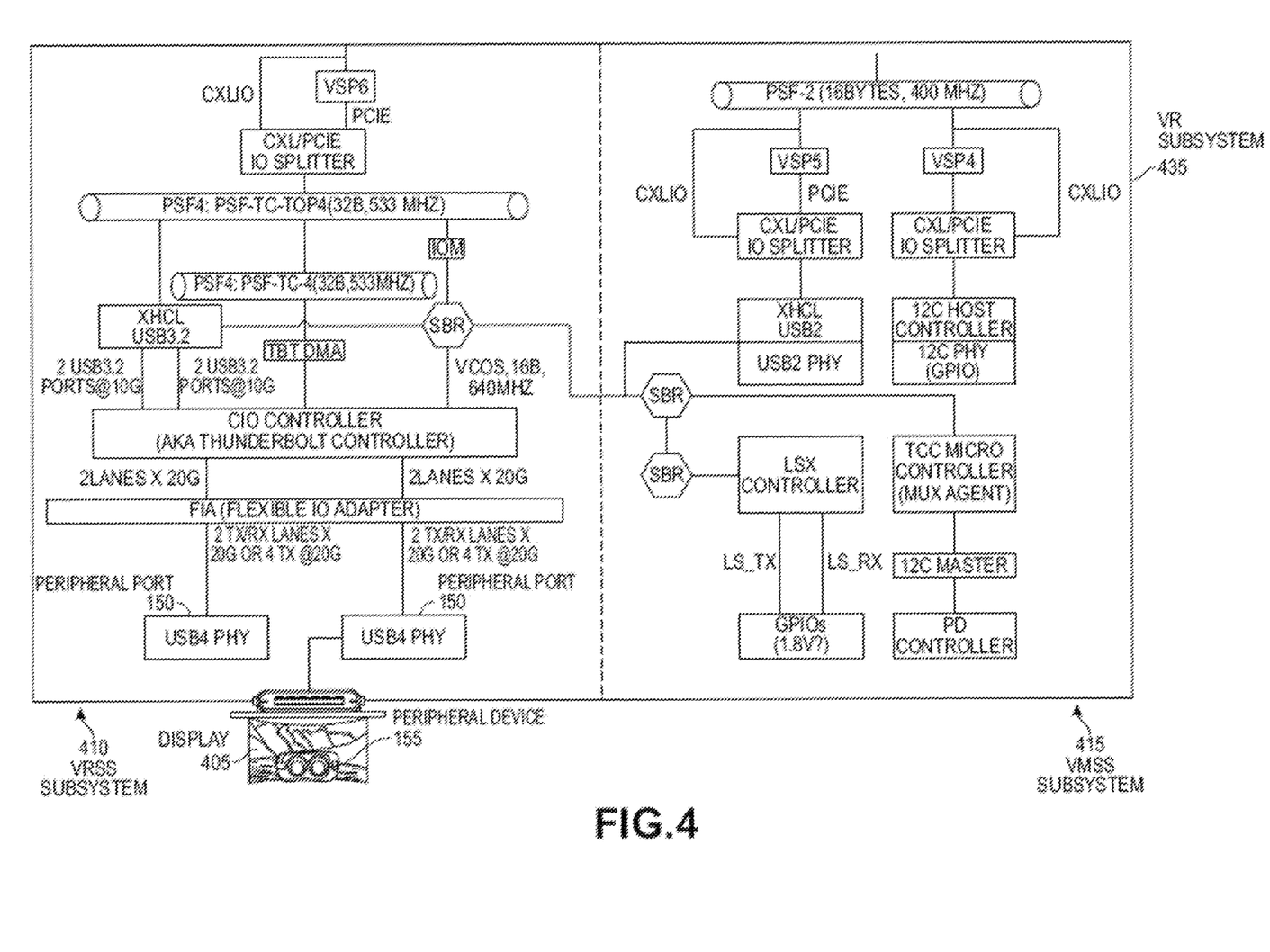
FIG. 4 illustrates an example of a VR subsystem, in accordance with various embodiments.

FIG. 4 illustrates an example of a VR subsystem 435, in accordance with various embodiments. Generally, the VR subsystem may be similar to, and share one or more characteristics with, the VR subsystem 335. Similarly to FIG. 3, the depiction of the VR subsystem 435 is intended to show an example of a VR subsystem (e.g., VR subsystem 135) at a different level of detail than may be present in other embodiments.

The VR subsystem 435 may include a virtual reality subsystem (VRSS) subsystem 410 and a virtual reality control subsystem (referred to herein as "VMSS") subsystem 415. In embodiments, the VRSS subsystem 410 may include components that route display and USB traffic into and out of a controller subsystem such as controller subsystem 110. The VMSS subsystem 415 may also be responsible for setting flags to route A/V data to the memory subsystem 145 rather than the host memory 120. The VMSS subsystem 415 may be responsible for detecting platform configuration and enabling/disabling the VRSS subsystem 410. The VMSS subsystem 415 may also perform power management functions for the VRSS subsystem 410, and interacting with a micro controller of the controller subsystem 110 to inject control inputs into the VRSS subsystem 410.

FIG. 4 further depicts a peripheral device 155 coupled with a peripheral port 150 as explained above. An example display 405 of the peripheral device 155 is further shown. As noted, the display 405 of the peripheral device may be based on rendered data provided by a graphics engine such as graphics engine 140.

Generally, communication between elements within the electronic system (e.g., electronic system 100) and, particularly, the controller subsystem (e.g., controller subsystem 110) may involve communication along one or more lanes. Such lanes may be referenced or depicted in, for example, FIG. 4. Table 1, below, depicts an example of various configurations that may be used for communication along such lanes.

TABLE 1

| Lane 1 | Lane 2 | Possible Configurations |
| --- | --- | --- |
| USB Type-C | USB Type-C | Both lanes have the same data rate, for example 20.6 giga transfers/second ("G"), 10.3 G, 20 G, or 10 G. |
| USB Type-C | No connection | Lane 1 operates at 20.6 G, 10.3 G, 20 G, or 10 G. |
| Display Port (DP) × 2 | USB 3.× | All display speeds are supported up to 20 G, USB3.0, USB3.1 speeds, etc. |
| DP × 4 | | Both lanes have the same DP rate. For example, there may be four transmitter lanes total, each capable of transmitting at 20 G. |

As previously noted, during high-resolution VR or AR experiences, it may be desirable to minimize latency. This is because the human brain is sensitive to latency between movement and resultant visual input. As such, it may be desirable to have the latency on the order of less than approximately 7 milliseconds.

Generally, a significant portion of the latency may come from transfer of data (e.g., input sensor data) from a peripheral device such as peripheral device 155 to the host system 105 for processing by a host controller 115 or storage by a host memory 120. Additionally, if the input data is stored in the host memory 120, then further latency may be introduced based on transferring the data from the host memory 120 to the graphics engine 140, or by subsequent storage of the rendered data from the graphics engine 140 to the host memory 120. Even further latency may be introduced through the transfer of the rendered data from the host memory 120 back through the controller subsystem 110 to the peripheral device 155.

Embodiments herein relate to a technique that may use the various configurations of electronics systems, host or controller subsystems, memory subsystems, and VR subsystems 135 to mitigate and significantly reduce that latency. Specifically, as described above, embodiments may relate to techniques by which A/V data (e.g., input sensor data) received from a peripheral device such as peripheral device 155 is identified by the VR subsystem 135. Rather than being stored in the host memory 120, the A/V data may be stored in the memory subsystem 145 of the controller subsystem 110. The host controller 115, which may be at least partially running the software program on which the VR or AR experience is based, may be informed of the existence of the data and its storage location by one or more pointers to the storage location of the data in the memory subsystem 145. The host controller 115 may provide rendering instructions to the graphics engine 140, which may then generate rendered data (e.g., rendered graphical data) based on the data stored in the memory subsystem 145. The rendered data may then be supplied to the peripheral device 155 for rendering to the user. The pointers to the data in the memory subsystem 145 may be substantially smaller than the data itself, and so transfer of the pointers to the host controller 115 may take significantly less time than the above-described transfer of the data between the controller subsystem 110 and the host system 105. Therefore, through the storage of the data in the memory subsystem 145 rather than the host memory 120, the latency of the electronic system 100 may be significantly reduced.

Figure 5:
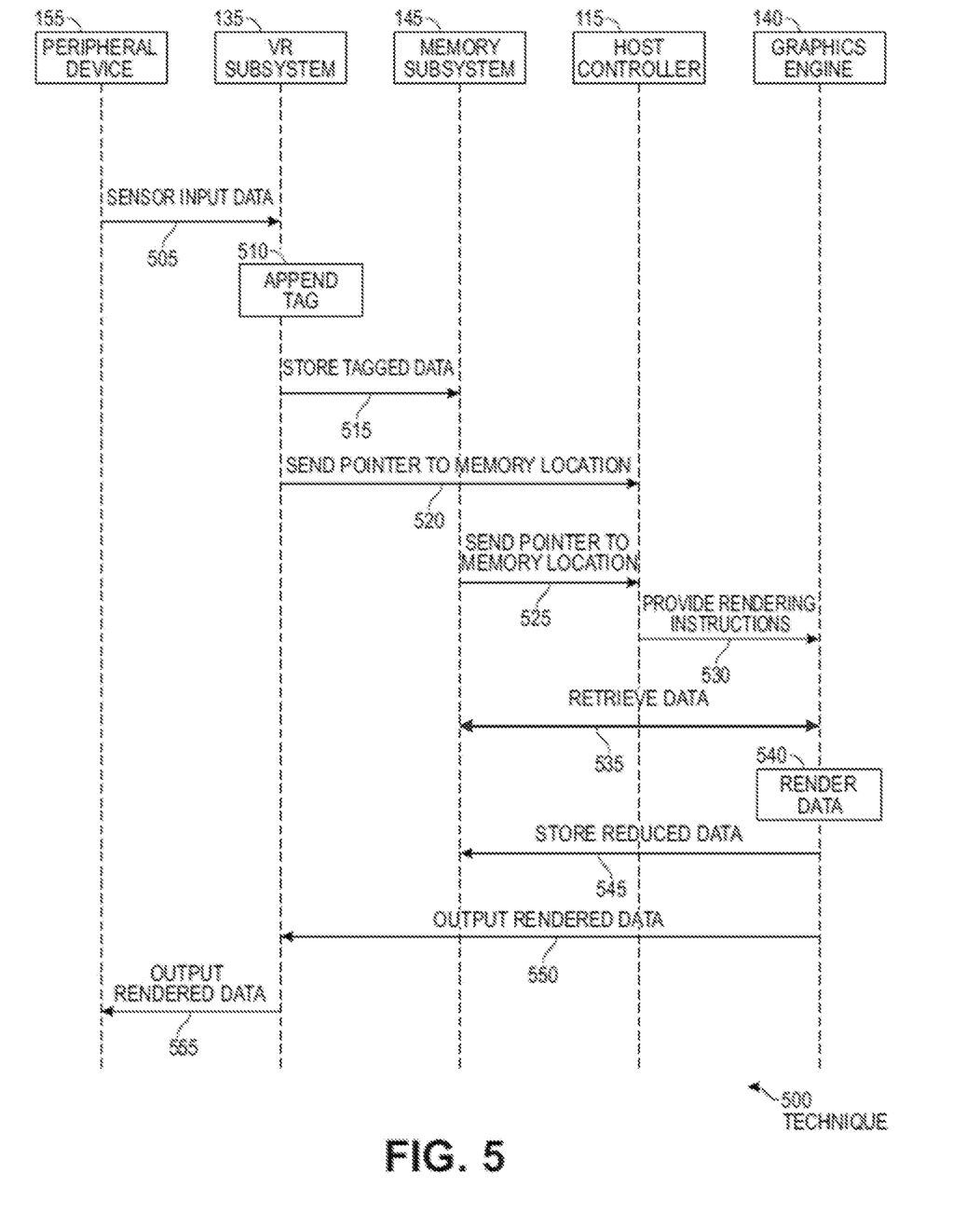
FIG. 5 illustrates an example technique related to A/V data flow, in accordance with various embodiments.

FIG. 5 illustrates an example technique 500 related to A/V data flow, in accordance with various embodiments and the description above. Specifically, sensor input data may be provided from the peripheral device 155 to the VR subsystem 135 at 505. As noted, the sensor input data may related to a sensor such as an accelerometer, a microphone, a camera, a radar system, a LiDAR system, or some other sensor of the peripheral device 155.

The VR subsystem 135 may then identify the data as A/V data that is related to the VR or AR experience of a user of the peripheral device 155, and append a tag of some form to the data at 510. Such a tag may include one or more routing instructions or indications that may be inserted into the data. For example, the routing instructions or indications may be addressing information by which a router of the controller subsystem 110 (for example, as may be part of or communicatively coupled with the VR subsystem 135, the bus 130, and/or the memory subsystem 145) may identify a location in the memory subsystem 145 at which to store the sensor data. Based on the appended tag, the data may be stored in the memory subsystem 145 at 515.

A pointer to the memory location may then be sent to the host controller 115 at 520 and/or 525. For example, in some embodiments the VR subsystem 135 may provide an indication of such a pointer to the host controller 115 at 520. Additionally or alternatively, the memory subsystem 145 may provide a pointer to the memory location at 525. In some embodiments, both the VR subsystem 135 and the memory subsystem 145 may provide complementary pointers (e.g., the VR subsystem 135 may provide an indication that the data is stored in the memory subsystem 145 while the memory subsystem 145 provides an indication of an address of the data), while in other embodiments only a single pointer may be necessary.

Based on the pointers, the host controller 115 may provide rendering instructions to the graphics engine 140 at 530. Such rendering instructions may include instructions related to specific data, as well as an indication of an address of the data. For example, the host controller 115 may provide, to the graphics engine 140, an address of data in the memory subsystem 145 as well as specific instructions related to how such data should be rendered (e.g., rotation of a previously rendered image, zooming in or out, a new object appearing, etc.).

Based on the rendering instructions received at 530, the graphics engine 140 may retrieve data from the memory subsystem 145 at 535. Such data may be, for example, the sensor input data provided at 505. Additionally or alternatively, the data may be previously rendered images that have since been stored in the memory subsystem 145. The data may also be or include some type of data that has been previously stored in the memory subsystem 145 (e.g., user preferences related to the peripheral device 155 or some other form of data).

Based on the data retrieved at 535, the graphics engine 140 may then generate rendered data at 540. Such rendered data may be, for example, one or more rendered images that are based on the rendering instructions at 530 and the data at 535. In some embodiments, the rendered data may additionally or alternatively include audio data. The graphics engine 140 may then store the rendered data in the memory subsystem 145 for future rendering at 545.

Additionally, the graphics engine 140 may output the rendered data at 550 to the VR subsystem 135. The VR subsystem 135 may process the rendered data (e.g., by converting the format of the rendered data to a format that is appropriate for output by a peripheral port 150) and output the rendered data to the peripheral device 155 at 555 for display by the peripheral device 155.

Figure 6:
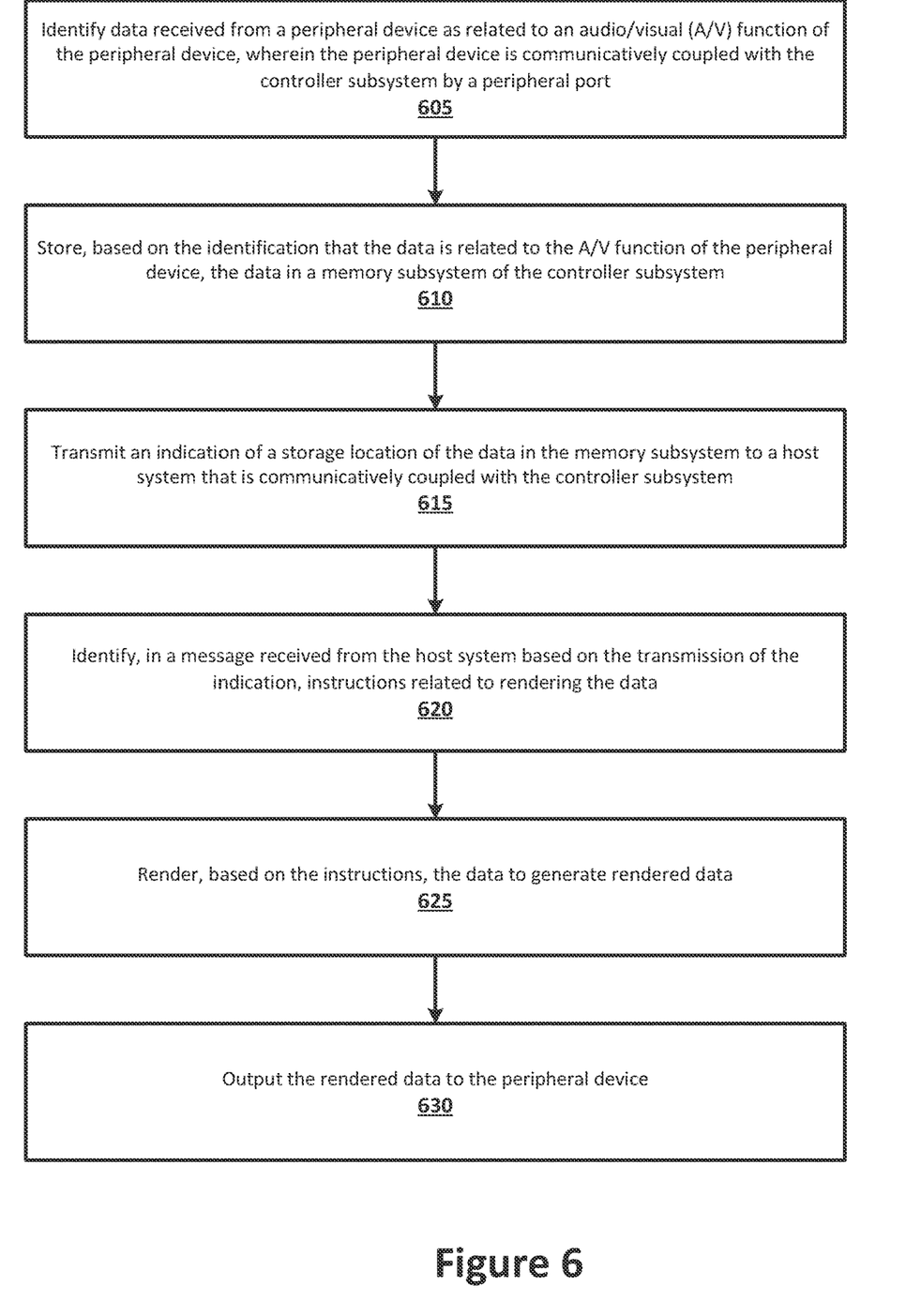
FIG. 6 illustrates an alternative example technique related to A/V data flow, in accordance with various embodiments.

FIG. 6 illustrates an alternative example technique related to A/V data flow, in accordance with various embodiments. Generally, the technique of FIG. 6 may be performed by a controller subsystem such as controller subsystem 110 or some other controller subsystem discussed herein.

The technique may include identifying, at 605, data received from a peripheral device as related to an A/V function of the peripheral device. The peripheral device may be, for example, peripheral device 155 that is communicatively coupled with the controller subsystem 110 by a peripheral port such as peripheral port 150. The data may be, for example, the sensor data discussed with respect to element 505. For example, the sensor data may be visual data (e.g., from a camera), sound data (e.g., from a microphone), movement data (e.g., from an accelerometer), or some other type of data. In some embodiments, element 605 may be performed by VR subsystem 135.

The technique may further include storing, at 610, based on the identification that the data is related to the A/V function of the peripheral device, the data in a memory subsystem of the controller subsystem. The memory subsystem may be, for example, memory subsystem 145. Such storage may be similar to that of element 515, described above, and may be performed by one or more of VR subsystem 135, bus 130, memory subsystem 145, one or more routers of the controller subsystem 110, and/or some other element of the controller subsystem 110.

The technique may further include transmitting, at 615, an indication of a storage location of the data in the memory subsystem to a host system that is communicatively coupled with the controller subsystem. The indication may be, for example, a pointer such as the pointers discussed with respect to elements 520 or 525 that are sent to a host system such as 105 and, particularly, a host controller such as host controller 115. In some embodiments, element 615 may be performed by one or both of VR subsystem 135 and memory subsystem 145.

The technique may further include identifying, at 620, in a message received from the host system based on the transmission of the indication, instructions related to rendering the data. Such instructions may be, for example, the rendering instructions discussed with respect to element 530. Element 620 may be performed by, for example, the graphics engine 140.

The technique may further include rendering, at 625, based on the instructions, the data to generate rendered data. Such rendering may be similar to, for example, elements 535 and 540 as described above. Element 625 may be performed by, for example, the graphics engine 140.

The technique may further include outputting, at 630, the rendered data to the peripheral device. Such outputting may be similar to that described above with respect to elements 550 and/or 555, and may be performed by the graphics engine 140 and/or the VR subsystem 135.

It will be understood that the techniques described with respect to FIGS. 5 and 6 are intended as high level example techniques for the sake of discussion. In some embodiments, certain elements may be performed in a different order than depicted. In some embodiments, the techniques may have more or fewer elements than are discussed. Other embodiments may vary.

Figure 7:
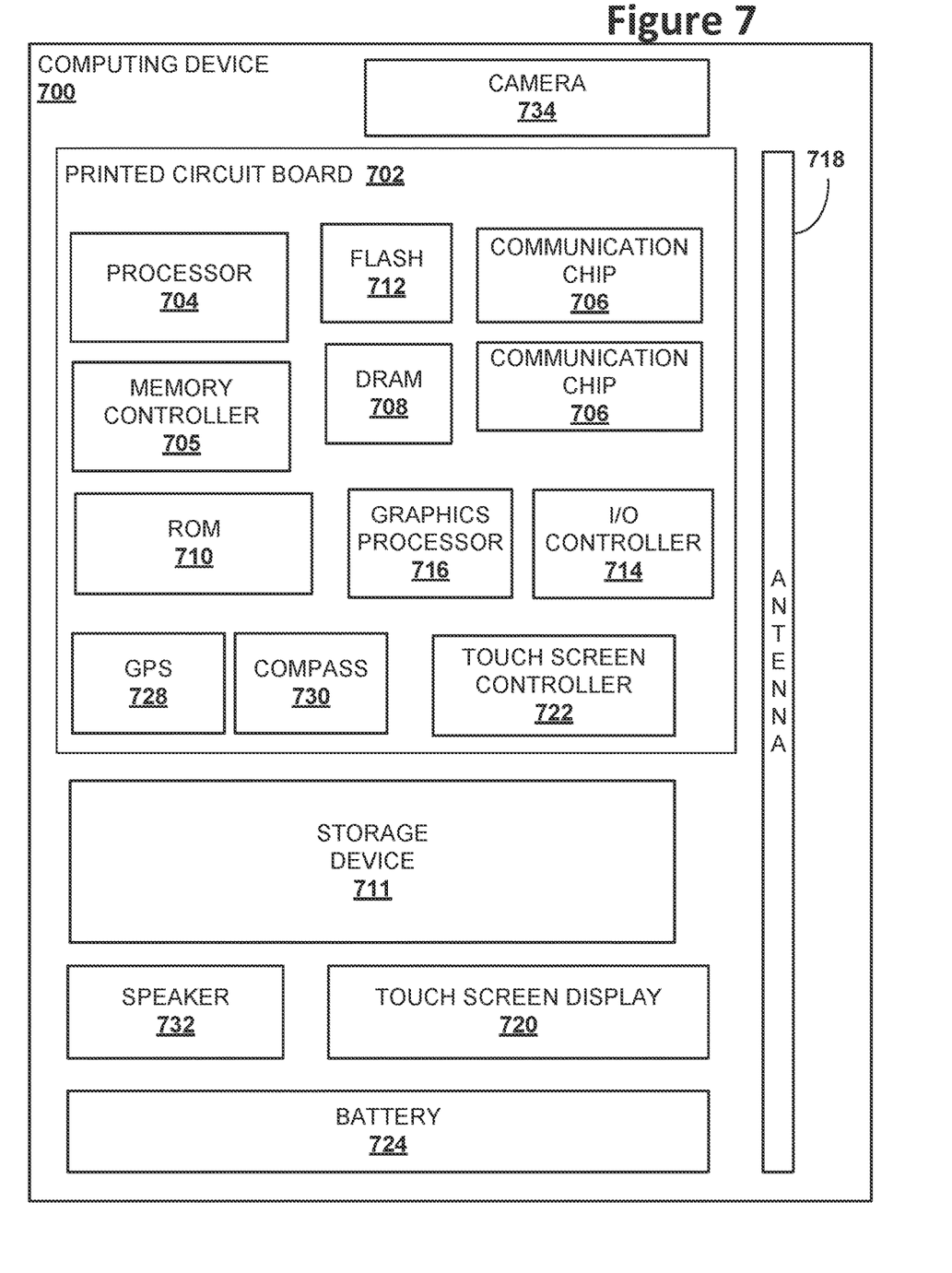
FIG. 7 illustrates an example system configured to employ the apparatuses and methods described herein, in accordance with various embodiments.

FIG. 7 illustrates an example computing device 700 that may employ the apparatuses and/or techniques described herein (e.g., electronic system 100, the techniques of FIG. 5 or 6, etc.), in accordance with various embodiments. As shown, computing device 700 may include a number of components, such as one or more processor(s) 704 (one shown) and at least one communication chip 706. In various embodiments, the one or more processor(s) 704 each may include one or more processor cores. In various embodiments, the at least one communication chip 706 may be physically and electrically coupled to the one or more processor(s) 704. In further implementations, the communication chip 706 may be part of the one or more processor(s) 704. In various embodiments, computing device 700 may include printed circuit board (PCB) 702. For these embodiments, the one or more processor(s) 704 and communication chip 706 may be disposed thereon. In alternate embodiments, the various components may be coupled without the employment of PCB 702.

Depending on its applications, computing device 700 may include other components that may or may not be physically and electrically coupled to the PCB 702. These other components include, but are not limited to, memory controller 705, volatile memory (e.g., dynamic random access memory (DRAM) 708), non-volatile memory such as read only memory (ROM) 710, flash memory 712, storage device 711 (e.g., a hard-disk drive (HDD)), an input/output (I/O) controller 714, a digital signal processor (not shown), a crypto processor (not shown), a graphics processor 716, one or more antenna 718, a display (not shown), a touch screen display 720, a touch screen controller 722, a battery 724, an audio codec (not shown), a video codec (not shown), a global positioning system (GPS) device 728, a compass 730, an accelerometer (not shown), a gyroscope (not shown), a speaker 732, a camera 734, and a mass storage device (such as hard disk drive, a solid state drive, compact disk (CD), digital versatile disk (DVD)) (not shown), and so forth. In various embodiments, the processor 704 may be integrated on the same die with other components to form a System on Chip (SoC).

In some embodiments, the one or more processor(s) 704, flash memory 712, and/or storage device 711 may include associated firmware (not shown) storing programming instructions configured to enable computing device 700, in response to execution of the programming instructions by one or more processor(s) 704, to practice all or selected aspects of the methods described herein. In various embodiments, these aspects may additionally or alternatively be implemented using hardware separate from the one or more processor(s) 704, flash memory 712, or storage device 711.

The communication chips 706 may enable wired and/or wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth, and a second communication chip 706 may be dedicated to longer range wireless communications such as GPS, EDGE, GPRS, CDMA, WiMAX, LTE, Ev-DO, and others.

In various implementations, the computing device 700 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 700 may be any other electronic device that processes data.

Some non-limiting examples of various embodiments are provided below.

Example 1 includes a controller subsystem comprising: a memory subsystem; a virtual reality (VR) subsystem to: identify data received from a peripheral device as related to an audio/visual (A/V) function of the peripheral device, wherein the peripheral device is communicatively coupled with the controller subsystem by a peripheral port; direct, based on the identification that the data is related to the A/V function of the peripheral device, the data to be stored in the memory subsystem; facilitate transmission of an indication of a storage location of the data in the memory subsystem to a host system that is communicatively coupled with the controller subsystem; and a graphics engine to: identify, in a message received from the host system based on the transmission of the indication of the storage location of the data, instructions related to rendering the data; and generate, based on the data received from the peripheral device, rendered data.

Example 2 includes the controller subsystem of claim 1, or some other example herein, wherein the VR subsystem is further to output the rendered data to the peripheral device.

Example 3 includes the controller subsystem of claim 1, or some other example herein, wherein: the data received from the peripheral device is based on physical movement of the peripheral device; and the rendered data is graphical or audio data that is altered based on the physical movement of the peripheral device.

Example 4 includes the controller subsystem of claim 1, or some other example herein, wherein the data received from the peripheral device is based on one or more sensors of the peripheral device.

Example 5 includes the controller subsystem of claim 4, or some other example herein, wherein a sensor of the one or more sensors is an accelerometer that detects physical movement of the peripheral device.

Example 6 includes the controller subsystem of claim 4, or some other example herein, wherein a sensor of the one or more sensors is a microphone of the peripheral device.

Example 7 includes the controller subsystem of claim 4, or some other example herein, wherein a sensor of the one or more sensors is a camera of the peripheral device.

Example 8 includes the controller subsystem of claim 1, or some other example herein, wherein the peripheral port is a universal serial bus (USB) port.

Example 9 includes the controller subsystem of claim 8, or some other example herein, wherein the USB port is a USB type 4 port.

Example 10 includes the controller subsystem of claim 1, or some other example herein, wherein the controller subsystem is implemented on a system on chip (SoC).

Example 11 includes the controller subsystem of claim 1, or some other example herein, wherein the peripheral device is a virtual reality (VR) or augmented reality (AR) device.

Example 12 includes the controller subsystem of claim 1, or some other example herein, wherein the VR subsystem is to direct storage of the data in the memory subsystem by altering the data to include a tag.

Example 13 includes the controller subsystem of claim 1, or some other example herein, wherein the A/V function is a virtual reality (VR) or augmented reality (AR) function.

Example 14 includes one or more non-transitory computer-readable media comprising instructions that, upon execution of the instructions by a logic of a controller subsystem of an electronic device, are to cause the controller subsystem to: identify data received from a peripheral device as related to an audio/visual (A/V) function of the peripheral device, wherein the peripheral device is communicatively coupled with the controller subsystem by a peripheral port; store, based on the identification that the data is related to the A/V function of the peripheral device, the data in a memory subsystem of the controller subsystem; transmit an indication of a storage location of the data in the memory subsystem to a host system that is communicatively coupled with the controller subsystem; identify, in a message received from the host system based on the transmission of the indication, instructions related to rendering the data; render, based on the instructions, the data to generate rendered data; and output the rendered data to the peripheral device.

Example 15 includes the one or more non-transitory computer-readable media of claim 14, or some other example herein, wherein: the data received from the peripheral device is based on physical movement of the peripheral device; and the rendered data is graphical or audio data that is altered based on the physical movement of the peripheral device.

Example 16 includes the one or more non-transitory computer-readable media of claim 14, or some other example herein, wherein the data received from the peripheral device is based on one or more sensors of the peripheral device.

Example 17 includes the one or more non-transitory computer-readable media of claim 16, or some other example herein, wherein a sensor of the one or more sensors is an accelerometer that detects physical movement of the peripheral device.

Example 18 includes the one or more non-transitory computer-readable media of claim 16, or some other example herein, wherein a sensor of the one or more sensors is a microphone of the peripheral device.

Example 19 includes the one or more non-transitory computer-readable media of claim 16, or some other example herein, wherein a sensor of the one or more sensors is a camera of the peripheral device.

Example 20 includes the one or more non-transitory computer-readable media of claim 14, or some other example herein, wherein the peripheral port is a universal serial bus (USB) port.

Example 21 includes the one or more non-transitory computer-readable media of claim 20, or some other example herein, wherein the USB port is a USB type 4 port.

Example 22 includes the one or more non-transitory computer-readable media of claim 14, or some other example herein, wherein the controller subsystem is implemented on a system on chip (SoC).

Example 23 includes the one or more non-transitory computer-readable media of claim 14, or some other example herein, wherein the peripheral device is a virtual reality (VR) or augmented reality (AR) device.

Example 24 includes the one or more non-transitory computer-readable media of claim 14, or some other example herein, wherein the instructions are further to direct storage of the data in the memory subsystem by altering the data to include a tag.

Example 25 includes the one or more non-transitory computer-readable media of claim 14, or some other example herein, wherein the A/V function is a virtual reality (VR) or augmented reality (AR) function.

Example 26 includes an electronic system comprising: a host system; a peripheral device; and a controller subsystem communicatively coupled with the host system and the peripheral device, wherein the controller subsystem is to: identify data received from a peripheral device as related to an audio/visual (A/V) function of the peripheral device, wherein the peripheral device is communicatively coupled with the controller subsystem by a peripheral port; store, based on the identification that the data is related to the A/V function of the peripheral device, the data in a memory subsystem of the controller subsystem; transmit an indication of a storage location of the data in the memory subsystem to a host system that is communicatively coupled with the controller subsystem; identify, in a message received from the host system based on the transmission of the indication, instructions related to rendering the data; render, based on the instructions, the data to generate rendered data; and output the rendered data to the peripheral device.

Example 27 includes the electronic system of claim 26, or some other example herein, wherein: the data received from the peripheral device is based on physical movement of the peripheral device; and the rendered data is graphical or audio data that is altered based on the physical movement of the peripheral device.

Example 28 includes the electronic system of claim 26, or some other example herein, wherein the data received from the peripheral device is based on one or more sensors of the peripheral device.

Example 29 includes the electronic system of claim 28, or some other example herein, wherein a sensor of the one or more sensors is an accelerometer that detects physical movement of the peripheral device.

Example 30 includes the electronic system of claim 28, or some other example herein, wherein a sensor of the one or more sensors is a microphone of the peripheral device.

Example 31 includes the electronic system of claim 28, or some other example herein, wherein a sensor of the one or more sensors is a camera of the peripheral device.

Example 32 includes the electronic system of claim 26, or some other example herein, wherein the peripheral port is a universal serial bus (USB) port.

Example 33 includes the electronic system of claim 32, or some other example herein, wherein the USB port is a USB type 4 port.

Example 34 includes the electronic system of claim 26, or some other example herein, wherein the controller subsystem is implemented on a system on chip (SoC).

Example 35 includes the electronic system of claim 26, or some other example herein, wherein the peripheral device is a virtual reality (VR) or augmented reality (AR) device.

Example 36 includes the electronic system of claim 26, or some other example herein, wherein the controller subsystem is further to direct storage of the data in the memory subsystem by altering the data to include a tag.

Example 37 includes the electronic system of claim 26, or some other example herein, wherein the A/V function is a virtual reality (VR) or augmented reality (AR) function.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A controller system comprising:
    memory system circuitry;
    virtual reality (VR) system circuitry to:
        based on a determination that sensor data from a peripheral device is related to an audio/visual (A/V) function of the peripheral device, append address information of the memory system circuitry to the sensor data, the address information to cause the sensor data to be stored in the memory system circuitry, the peripheral device to communicate with the controller system;
        cause transmission of a pointer to a host system, the pointer to reference a storage location of the sensor data in the memory system circuitry, the host system to communicate with the controller system; and
    graphics engine circuitry to:
        obtain, from a message from the host system after the transmission of the pointer, one or more instructions related to generation of rendered data based on the sensor data; and
        generate the rendered data based on the sensor data and the one or more instructions.

2. The controller system of claim 1, wherein the VR system circuitry is to output the rendered data to the peripheral device.

3. The controller system of claim 1, wherein:
    the sensor data from the peripheral device is based on physical movement of the peripheral device; and
    the graphics engine circuitry is to render at least one of graphical data or audio data based on the physical movement of the peripheral device to generate the rendered data.

4. The controller system of claim 1, wherein the sensor data is based on one or more sensors of the peripheral device.

5. The controller system of claim 4, wherein the one or more sensors include at least one of an accelerometer that detects physical movement of the peripheral device, a microphone of the peripheral device, or a camera of the peripheral device.

6. The controller system of claim 1, wherein the VR system circuitry is to be coupled to the peripheral device by a universal serial bus (USB) port.

7. The controller system of claim 1, wherein the controller system is implemented on a system on chip (SoC).

8. The controller system of claim 1, wherein the peripheral device is a VR device or an augmented reality (AR) device.

9. The controller system of claim 1, wherein the VR system is to a routing instructions to the sensor data, the routing instructions including the address information.

10. The controller system of claim 1, wherein the A/V function includes at least one of a VR function or an AR function.

11. At least one memory or storage device comprising programming instructions to cause at least one programmable circuit to at least:
    based on a determination that sensor data from a peripheral device is related to an audio/visual (A/V) function of the peripheral device, append address information associated with memory system circuitry to the sensor data, the address information to cause the sensor data to be stored in the memory system circuitry;
    cause transmission of a pointer to a host system, the pointer to reference a storage location of the sensor data in the memory system circuitry;
    obtain, from a message from the host system after the transmission of the pointer, one or more rendering instructions related to generation of rendered data based on the sensor data;
    generate the rendered data based on the rendering instructions and the sensor data; and
    cause the rendered data to be output to the peripheral device.

12. The at least one memory or storage device of claim 11, wherein:
    the sensor data from the peripheral device is based on physical movement of the peripheral device; and
    the programming instructions are to cause one or more of the at least one programmable circuit to render at least one of graphical data or audio data based on the physical movement of the peripheral device to generate the rendered data.

13. The at least one memory or storage device of claim 11, wherein the sensor data is based on one or more sensors of the peripheral device.

14. The at least one memory or storage device of claim 11, wherein the programming instructions are to cause one or more of the at least one programmable circuit to obtain the sensor data via a USB type 4 port.

15. The one of claim 11, wherein the programming instructions are to cause one or more of the at least one programmable circuit to append a routing instruction to the sensor data, the routing instruction including the address information.

16. An electronic system comprising:
a host system;
a peripheral device;
programming instructions; and
at least one programmable circuit to be programmed based on the programming instructions to:
  based on a determination that sensor data from a peripheral device is related to an audio/visual (A/V) function of the peripheral device, append address information of memory system circuitry to the sensor data, the address information to cause the sensor data to be stored in the memory system circuitry;
  cause transmission of a pointer to a host system, the pointer to reference a storage location of the sensor data in the memory system circuitry;
  obtain, from a message from the host system after the transmission of the pointer, one or more rendering instructions related to generation of rendered data based on the sensor data;
  generate the rendered data based on the rendering instructions and the sensor data; and
  cause the rendered data to be output to the peripheral device.

17. The electronic system of claim 16, wherein:
the sensor data from the peripheral device is based on physical movement of the peripheral device; and
one or more of the at least one programmable circuit is to render at least one of graphical or audio data based on the physical movement of the peripheral device to generate the rendered data.

18. The electronic system of claim 16, wherein the sensor data is based on one or more sensors of the peripheral device.

19. The electronic system of claim 16, wherein the at least one programmable circuit is implemented on a system on chip (SoC).

20. The electronic system of claim 16, wherein one or more of the at least one programmable circuit is to append a routing instruction to the sensor data, the routing instruction including the address information.

\* \* \* \* \*